United States Patent [19]

Grose

[11] Patent Number: 4,759,516

[45] Date of Patent: * Jul. 26, 1988

[54] CASCADED TURBULENCE GENERATION INHIBITOR

[75] Inventor: Ronald D. Grose, 61 Hwy. 211, Newport, Wash. 99156

[73] Assignee: Ronald D. Grose, Newport, Wash.

[ * ] Notice: The portion of the term of this patent subsequent to Mar. 17, 2004 has been disclaimed.

[21] Appl. No.: 782,041

[22] Filed: Sep. 30, 1985

[51] Int. Cl.$^4$ .............................................. B64C 1/38
[52] U.S. Cl. ..................................... 244/130; 244/200; 138/38
[58] Field of Search .................. 244/199, 200, 136; 138/38; 165/177, 179

[56] References Cited

U.S. PATENT DOCUMENTS

| Re. 13,397 | 4/1912 | Way | 244/200 |
|---|---|---|---|
| 1,903,823 | 8/1933 | Lougheed | 244/200 |
| 2,322,632 | 6/1943 | Harper | 244/200 |
| 2,899,150 | 8/1959 | Ellis | 244/200 |
| 3,273,599 | 9/1966 | Heeren | 138/38 |
| 3,411,738 | 11/1968 | Sargent | 244/199 |
| 3,525,486 | 8/1970 | Wimpenny | 244/199 |
| 3,762,468 | 10/1973 | Newson | 165/177 |
| 3,776,363 | 12/1973 | Kuethe | 244/199 |
| 4,044,797 | 8/1977 | Fujie | 138/38 |
| 4,154,296 | 5/1979 | Fijas | 138/38 |
| 4,248,179 | 2/1981 | Bonner | 122/235 C |
| 4,402,359 | 9/1983 | Carnavos | 165/70 |

OTHER PUBLICATIONS

Salisbury, David F., "A Groovy Solution for Engineers Who Find Turbulence a Real Drag", *Christian Science Monitor*, 2-10-84, p. 4.

Primary Examiner—Galen Barefoot
Assistant Examiner—Lynn M. Fiorito
Attorney, Agent, or Firm—Zarley, McKee, Thomte, Voorhees & Sease

[57] ABSTRACT

A turbulence generation inhibitor comprising a fluid conduit having an interior wall surface with the interior wall surface having a plurality of spaced-apart microscopic grooves formed therein which are parallel to the mean-flow direction. Each of the grooves is defined by oppositely disposed side walls with the side walls of each of the grooves having at least one catenary shaped surface provided thereon.

4 Claims, 2 Drawing Sheets

CASCADED TURBULENCE GENERATION INHIBITOR

BACKGROUND OF THE INVENTION

This invention relates to a cascaded turbulence generation inhibitor and more particularly to a pipeline or the like having its interior wall surface micro-grooved.

As fluid passes through a conduit over pipe, a pressure drop is experienced primarily due to turbulent eddies being generated in the sub-layer adjacent to the interior wall surface of the tube or pipe. It has recently been experimentally verified that pressure drop reduction can be achieved by imparting to the appropriate surfaces a "micro-grooving". Prior art investigators achieved drag reduction by machining tiny grooves into the surface adjacent the fluid flow. More recently, 3M Corporation has developed a plastic micro-groove material which, when applied to the surface has been found, by several experimentalists, to cause a significant drag or pressure drop reduction.

The theoretical work of the instant inventor indicates that a much more complex groove geometry is required than that currently being proposed and used by the experimentalists. It is believed that applicant's groove geometry will provide a substantially greater drag reduction over a wider operational range than the less complex geometry presently being utilized in the prior art.

SUMMARY OF THE INVENTION

In the micro-grooving methods of the prior art, the cross section of the grooves is a saw-tooth or machine thread shape. In the instant invention, the saw-tooth profile has been modified to a catenary profile having an aspect ration of unity with the catenary profile being cascaded. In the instant invention, the cascaded geometry of the grooves is achieved by creating large grooves having a limited number of smaller grooves embossed on the surface, with each smaller groove, in turn, having a limited number of even smaller grooves embossed on its surface. The number of cascades desired and the size of the grooves is fluidynamically dependent (through the Reynolds number) on each specific application design.

It is therefore a principal object of the invention to provide improved geometry for micro-grooves in the surface adjacent the fluid flow.

A further object of the invention is to provide a cascaded turbulence generation inhibitor which inhibits the generation of turbulent eddies in the sub-layer adjacent to a flow constraining surface over a wide range of flow conditions.

Another object of the invention is to provide a method for substantially reducing pressure drop through a reduction in effective shear stress on a surface constraining a fluid in relative motion.

Yet another object of the invention is to provide a cascaded turbulence generation inhibitor which is embodied in a specific surface geometric shape which can be imparted to the surface by suitable machining operations or application of suitably shaped covering material or other means.

These and other objects will be apparent to those skilled in the art.

DESCRIPTION OF THE PREFERRED EMBODIMENT

Figure 1:
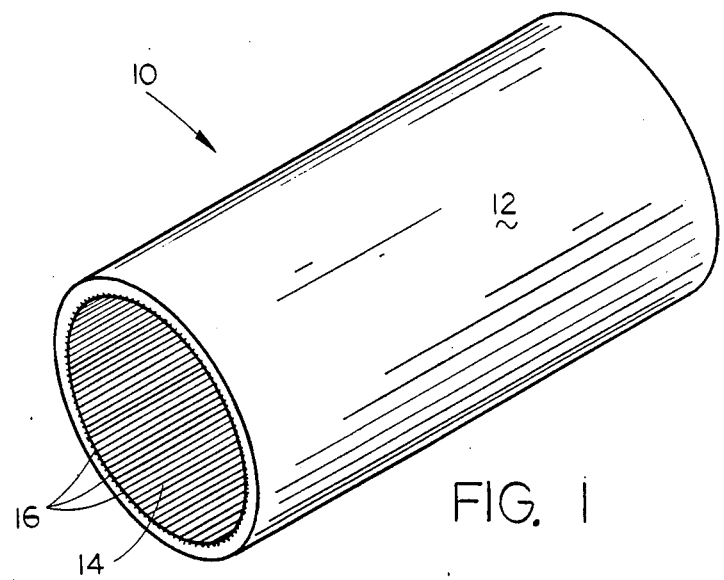
FIG. 1 is an end perspective view of a length of pipe having the micro-grooves of this invention formed in the interior surface thereof.

The numeral 10 refers to a length of pipe such as commonly used in a pipeline or the like having an outside surface 12 and an inside surface 14. The inside surface 14 of the pipe 10 is provided with a plurality of longitudinally extending grooves 16 which are parallel to the mean flow direction.

Figure 3:
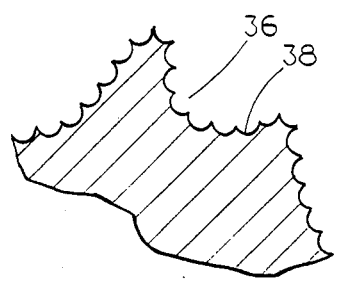
FIG. 3 is a sectional view as seen on lines 3—3 of FIG. 2.

Each of the grooves 16 is defined by oppositely disposed wall surfaces 18 and 20. Wall surface 18, in this example, is provided with four grooves 22, 24, 26 and 28 formed therein while wall surface 20 is provided with grooves 30, 32 and 34. Each of the grooves 22, 24, 26, 28, 30, 32 and 34 preferably have a catenary profile and it can be seen that the grooves are "cascaded". Each of the grooves 22, 24, 26, 28, 30, 32 and 34 are provided with smaller grooves 36 formed therein which also preferably have a catenary shape. As seen in FIG. 3, each of the grooves 36 is likewise preferably provided with smaller grooves 38. The number of grooves, spacing and depth will depend upon the particular design conditions.

In a pipeline application wherein the pipe diameter is 20 inches and the design point Reynolds number is 3.2 million, four cascades are preferably utilized. Pressure drop reduction will occur for all Reynolds numbers less than the design point.

Figure 2:
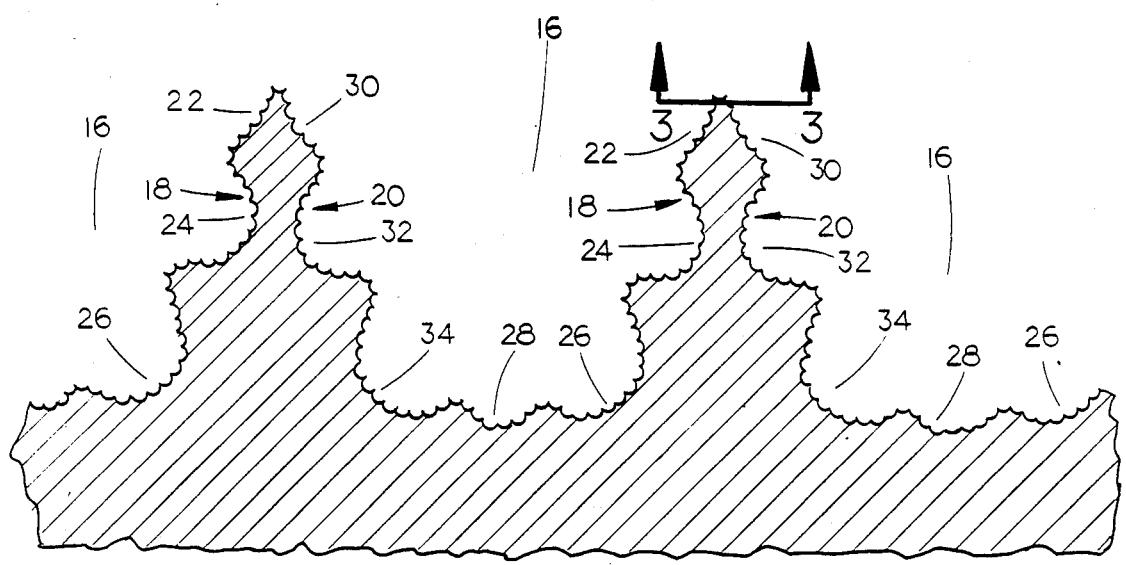
FIG. 2 is a sectional view illustrating the geometry of the micro-grooves.
Figure 4:
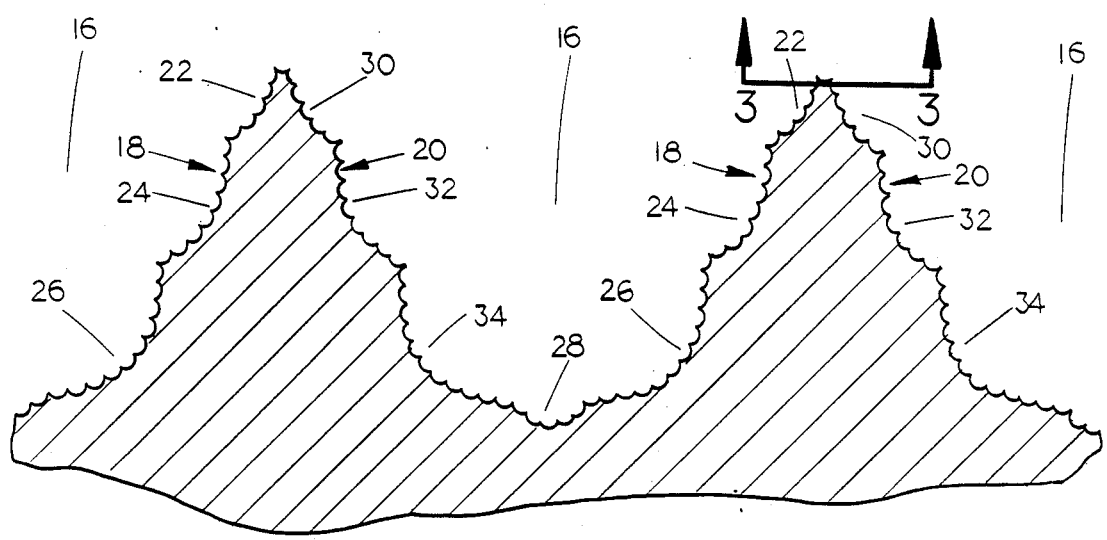
FIG. 4 is a view similar to FIG. 2 but which illustrates a somewhat modified form of the micro-grooves.

FIG. 4 illustrates a modified form of the invention wherein the wall thickness between the grooves is somewhat greater than the embodiment of FIGS. 1–3. The embodiment of FIG. 4 is designed to reduce "tip" breakage when compared to the embodiment of FIGS. 1–3. However, the performance characteristics of the embodiment of FIG. 4 may be somewhat less than the embodiment of FIGS. 1–3. In FIG. 4, identical reference numerals to that in FIGS. 1–3 are utilized.

Thus it can be seen that a novel groove geometry has been provided which results in substantially greater reduction in effective surface shear because progressively larger turbulent eddy scales are inhibited by the different sized grooves. It can therefore be seen that the invention accomplishes at least all of its stated objectives.

I claim:

1. A turbulence generation inhibitor comprising in combination,
   a fluid conduit having an interior wall surface,
     said interior wall surface having a plurality of spaced-apart microscopic grooves formed therein which are parallel to the mean-flow direction,
     each of said grooves being defined by oppositely disposed side walls,
     each of said side walls of each of said grooves having a plurality of catenary shaped surfaces provided thereon.

2. A turbulence generation inhibitor comprising in combination, a fluid conduit having an interior wall surface, said interior wall surface having a plurality of spaced-apart microscopic grooves formed therein which are parallel to the mean-flow direction, each of said grooves being defined by oppositely disposed side walls, each of said side walls of each of said grooves having at least one catenary shaped surface provided thereon, said catenary shaped surface having a plurality of catenary shaped surfaces provided thereon.

3. The turbulence generation inhibitor of claim 1 wherein each of said catenary shaped surfaces having a plurality of smaller catenary shaped surfaces provided thereon.

4. The turbulence generation inhibitor of claim 1 wherein said catenary shaped surfaces are cascaded.

* * * * *